United States Patent
Ratasuk et al.

(10) Patent No.: US 12,317,328 B2
(45) Date of Patent: May 27, 2025

(54) METHOD AND APPARATUS FOR SWITCHING OF DATA TRANSMISSION BETWEEN RADIO ACCESS TECHNOLOGIES FOR EARLY DATA TRANSMISSION

(71) Applicant: Nokia Technologies Oy, Espoo (FI)

(72) Inventors: Rapeepat Ratasuk, Inverness, IL (US); Nitin Mangalvedhe, Hoffman Estates, IL (US); Srinivasan Selvaganapathy, Bangalore (IN); Jussi-Pekka Koskinen, Oulu (FI); Michel Robert, Vanves (FR)

(73) Assignee: Nokia Technologies Oy, Espoo (FI)

( * ) Notice: Subject to any disclaimer, the term of this patent is extended or adjusted under 35 U.S.C. 154(b) by 429 days.

(21) Appl. No.: 17/770,139

(22) PCT Filed: Oct. 26, 2020

(86) PCT No.: PCT/EP2020/079980
§ 371 (c)(1),
(2) Date: Apr. 19, 2022

(87) PCT Pub. No.: WO2021/083815
PCT Pub. Date: May 6, 2021

(65) Prior Publication Data
US 2022/0394775 A1    Dec. 8, 2022

(30) Foreign Application Priority Data
Oct. 28, 2019 (IN) .............................. 201941043685

(51) Int. Cl.
*H04W 74/0833* (2024.01)
*H04W 48/16* (2009.01)
*H04W 88/06* (2009.01)

(52) U.S. Cl.
CPC ....... *H04W 74/0833* (2013.01); *H04W 48/16* (2013.01); *H04W 88/06* (2013.01)

(58) Field of Classification Search
None
See application file for complete search history.

(56) References Cited

U.S. PATENT DOCUMENTS

| 2016/0374048 A1 | 12/2016 | Griot et al. |
| 2018/0115945 A1* | 4/2018 | Lee ...................... H04W 48/18 |

(Continued)

FOREIGN PATENT DOCUMENTS

| CN | 108353453 A | 7/2018 |
| CN | 109874412 A | 6/2019 |

(Continued)

OTHER PUBLICATIONS

Office action received for corresponding European Patent Application No. 20797100.3, dated Feb. 16, 2023, 5 pages.

(Continued)

*Primary Examiner* — Robert M Morlan
(74) *Attorney, Agent, or Firm* — Barta Jones, PLLC

(57) ABSTRACT

An apparatus comprising: at least one processor; and at least one memory including computer program code, the at least one memory and computer program code configured to, with the at least one processor, cause the apparatus to perform: determining at least one condition; and based on the at least one condition, transmitting a data packet to a first access node using one of a first early data transmission type in a first mode of operation and a second early data transmission type in a second mode of operation of the apparatus.

12 Claims, 11 Drawing Sheets

(56) References Cited

U.S. PATENT DOCUMENTS

| | | |
|---|---|---|
| 2018/0324869 A1 | 11/2018 | Phuyal et al. |
| 2019/0045554 A1 | 2/2019 | Ye et al. |
| 2019/0104553 A1 | 4/2019 | Johansson et al. |
| 2019/0159197 A1 | 5/2019 | Shrestha et al. |
| 2019/0159260 A1 | 5/2019 | Charbit et al. |
| 2019/0174571 A1 | 6/2019 | Deenoo et al. |
| 2020/0374838 A1* | 11/2020 | Sha ................ H04W 76/27 |

FOREIGN PATENT DOCUMENTS

| | | |
|---|---|---|
| WO | 2019/062926 A1 | 4/2019 |
| WO | 2019/202451 A1 | 10/2019 |

OTHER PUBLICATIONS

"Key directions for Release 17", 3GPP TSG RAN Meeting #84, RP-190831, Nokia, Jun. 3-6, 2019, pp. 1-12.

"Correction on fallback cases in EDT", 3GPP TSG-RAN WG2 #103bis, R2-1814335, Agenda Item: 9.14.2, Ericsson, Oct. 8-12, 2018, 4 pages.

"On eMTC co-existence with NR", 3GPP TSG RAN WG1 Meeting #94, R1-1808122, Agenda Item: 6.2.1.4, Huawei, Aug. 20-24, 2018, 4 pages.

International Search Report and Written Opinion received for corresponding Patent Cooperation Treaty Application No. PCT/EP2020/079980, dated Jan. 28, 2021, 22 pages.

"Report on [100#38][MTC/NB-IoT] Padding issue in Msg3", 3GPP TSG-RAN WG2 #101, R2-1803077, Agenda Item: 9.14.2, Ericsson, Feb. 26-Mar. 2, 2018, 24 pages.

Office action received for corresponding Indian Patent Application No. 201941043685, dated Oct. 6, 2021, 6 pages.

Office Action received for corresponding Chinese Patent Application No. 202080075385.1, dated Jul. 4, 2024, 8 pages of Office Action and no page of translation available.

"Remaining issues for RACH report in NB-IoT and eMTC", 3GPP TSG-RAN2 meeting#105bis, R2-1904396, Agenda item: 12.2.6, ZTE Corporation, Apr. 8-12, 2019, 5 pages.

Mingyu, "Research on Synchronization of LTE Downlink", Dissertation, Harbin Engineering University, Jun. 2013, 76 pages.

Notice of Allowance received for corresponding European Patent Application No. 20797100.3, dated Mar. 3, 2025, 8 pages.

* cited by examiner

METHOD AND APPARATUS FOR SWITCHING OF DATA TRANSMISSION BETWEEN RADIO ACCESS TECHNOLOGIES FOR EARLY DATA TRANSMISSION

RELATED APPLICATION

This application was originally filed as PCT Application No. PCT/EP2020/079980, filed on Oct. 26, 2020, which claims priority from Indian Application No. 201941043685, filed on Oct. 28, 2019, each of which is incorporated herein by reference in its entirety.

TECHNICAL FIELD

The present disclosure relates to an apparatus, a method, and a computer program and in particular but not exclusively for an apparatus, methods and computer programs for switching data transmission between radio access technologies for early data transmission.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

STATEMENT OF INVENTION

According to an aspect, there is provided an apparatus comprising means for performing: determining at least one condition; and based on the at least one condition, transmitting a data packet to a first access node using one of a first early data transmission type in a first mode of operation of the apparatus and a second early data transmission type in a second mode of operation of the apparatus.

The first mode of operation may comprise one of a long term evolution mode and a new radio mode, and the second mode of operation may comprise the other of the long term evolution mode and the new radio mode.

The at least one condition is determined based on, at least one of: comparing a data packet size to a threshold data packet size; comparing a reference signal received power/reference signal received quality to a threshold reference signal received power/reference signal received quality; and comparing a power headroom to a threshold power headroom.

The means may be further configured to perform receiving the at least one condition from at least one of the first access node or a second access node.

The means may be further configured to perform receiving, from the second access node, information indicating network resources for data packet transmission to the first access node using the second mode of operation.

The first access node may comprise a gNB, and the second access node may comprise an eNB.

The information indicating the network resources may comprise information indicating one or more of a timing advance or a resource allocation.

The first early data transmission type and the second early data transmission type may comprise: transmitting a random access request comprising a random access preamble from the apparatus; and receiving a random access response at the apparatus in response to the random access request.

The first early data transmission type may further comprise: transmitting the data packet, by using a message 3 in the first mode of operation, based on the random access response.

The second early data transmission type may further comprise: transmitting the data packet, by using a message 3 in the second mode of operation, based on the random access response.

The second early data transmission type may comprise: transmitting a random access request comprising a random access preamble to the second access node; receiving a random access response from the second access node, wherein the random access response received from the second access node comprises information indicating network resources for the apparatus to monitor for communication from the first access node; receiving a random access response from the first access node based on the information indicating the network resources comprised in the random access response received from the second access node; and transmitting the data packet to the first access node using early data transmission in the second mode of operation.

The means may be further configured to perform switching from the second mode of operation to the idle state in the first mode of operation after the data packet is transmitted in the second mode of operation.

According to some examples the apparatus is in an idle state when in the first mode of operation.

Transmitting the data packet may comprise transmitting an identifier, wherein the identifier is configured to cause the data packet to be routed to a destination prior to connection establishment.

The connection establishment may comprise a radio resource control connection establishment procedure.

According to an aspect, there is provided an apparatus comprising means for performing: transmitting, to a user equipment, information indicating at least one condition configured to cause the user equipment to transmit a data packet using one of a first early data transmission type in a first mode of operation and a second early data transmission type in a second mode of operation based on the at least one condition; and transmitting, to the user equipment, information indicating network resources for the user equipment to perform data packet transmission using one of the first early data transmission type in the first mode of operation and the second early data transmission type in the second mode of operation.

The at least one condition may comprise at least one of: a threshold data packet size; a threshold reference signal received power/reference signal received quality; and a threshold power headroom.

The first early data transmission type may comprise: receiving a random access request comprising a random access preamble from the user equipment; and transmitting a random access response to the user equipment in response to the random access request.

The first early data transmission type may further comprise: receiving the data packet by using message 3.

The first early data transmission type may further comprise: receiving the data packet and an identifier by using message 3, wherein the apparatus is further configured to route the data packet to a destination based on the identifier.

The second early data transmission type may comprise: receiving, from the user equipment, a random access request comprising a random access preamble; and transmitting, to the user equipment, a first random access response comprising information indicating a physical downlink control channel for the user equipment to monitor for the user equipment to receive a second random access response from the second access node.

The information indicating network resources may comprise information indicating one or more of a timing advance or a resource allocation.

The means may be further configured to perform transmitting, to the second access node, information for configuring the second access node to transmit a random access response to the user equipment.

According to some examples the user equipment is in an idle state when in the first mode of operation.

According to an aspect there is provided an apparatus comprising at least one processor and at least one memory including computer code for one or more programs, the at least one memory and the computer code configured, with the at least one processor, to cause the apparatus at least to: determine at least one condition; and based on the at least one condition, transmit a data packet to a first access node using one of a first early data transmission type in a first mode of operation of the apparatus and a second early data transmission type in a second mode of operation of the apparatus.

The first mode of operation may comprise one of a long term evolution mode and a new radio mode, and the second mode of operation may comprise the other of the long term evolution mode and the new radio mode.

The at least one memory and the computer program code may be configured to, with the at least one processor, cause the apparatus to determine the at least one condition based on, at least one of: comparing a data packet size to a threshold data packet size; comparing a reference signal received power/reference signal received quality to a threshold reference signal received power/reference signal received quality; and comparing a power headroom to a threshold power headroom.

The at least one memory and the computer program code may be configured to, with the at least one processor, cause the apparatus to receive the at least one condition from at least one of the first access node or a second access node.

The at least one memory and the computer program code may be configured to, with the at least one processor, cause the apparatus to receive, from the second access node, information indicating network resources for data packet transmission to the first access node using the second mode of operation.

The first access node may comprise a gNB, and the second access node may comprise an eNB.

The information indicating the network resources may comprise information indicating one or more of a timing advance or a resource allocation.

When using the first early data transmission type and the second early data transmission type, the at least one memory and the computer program code may be configured to, with the at least one processor, cause the apparatus: transmit a random access request comprising a random access preamble from the apparatus; and receive a random access response at the apparatus in response to the random access request.

When using the first early data transmission type, the at least one memory and the computer program code may be configured to, with the at least one processor, cause the apparatus to: transmit the data packet, by using a message 3 in the first mode of operation, based on the random access response.

When using the second early data transmission type, the at least one memory and the computer program code may be configured to, with the at least one processor, cause the apparatus to: transmit the data packet, by using a message 3 in the second mode of operation, based on the random access response.

When using the second early data transmission type, the at least one memory and the computer program code may be configured to, with the at least one processor, cause the apparatus to: transmit a random access request comprising a random access preamble to the second access node; receive a random access response from the second access node, wherein the random access response received from the second access node comprises information indicating network resources for the apparatus to monitor for communication from the first access node; receive a random access response from the first access node based on the information indicating the network resources comprised in the random access response received from the second access node; and transmit the data packet to the first access node using early data transmission in the second mode of operation.

The at least one memory and the computer program code may be configured to, with the at least one processor, cause the apparatus to switch from the second mode of operation to the idle state in the first mode of operation after the data packet is transmitted in the second mode of operation.

According to some examples the apparatus is in an idle state when in the first mode of operation.

When transmitting the data packet, the at least one memory and the computer program code may be configured to, with the at least one processor, cause the apparatus to transmit an identifier, wherein the identifier is configured to cause the data packet to be routed to a destination prior to connection establishment.

The connection establishment may comprise a radio resource control connection establishment procedure.

According to an aspect, there is provided an apparatus comprising at least one processor and at least one memory including computer code for one or more programs, the at least one memory and the computer code configured, with the at least one processor, to cause the apparatus at least to: transmit, to a user equipment, information indicating at least one condition configured to cause the user equipment to transmit a data packet using one of a first early data transmission type in a first mode of operation and a second early data transmission type in a second mode of operation based on the at least one condition; and transmit, to the user equipment, information indicating network resources for the user equipment to perform data packet transmission using one of the first early data transmission type in the first mode of operation and the second early data transmission type in the second mode of operation.

The at least one condition may comprise at least one of: a threshold data packet size; a threshold reference signal received power/reference signal received quality; and a threshold power headroom.

When using the first early data transmission type, the at least one memory and the computer program code may be configured to, with the at least one processor, cause the apparatus to: receive a random access request comprising a random access preamble from the user equipment; and transmit a random access response to the user equipment in response to the random access request.

When using the first early data transmission type, the at least one memory and the computer program code may be configured to, with the at least one processor, cause the apparatus to: receive the data packet by using message 3.

When using the first early data transmission type, the at least one memory and the computer program code may be configured to, with the at least one processor, cause the apparatus to: receive the data packet and an identifier by using message 3, wherein the at least one memory and the computer program code may be further configured to, with the at least one processor, cause the apparatus to route the data packet to a destination based on the identifier.

When using the second early data transmission type, the at least one memory and the computer program code may be configured to, with the at least one processor, cause the apparatus to: receive, from the user equipment, a random access request comprising a random access preamble; and transmit, to the user equipment, a first random access response comprising information indicating a physical downlink control channel for the user equipment to monitor for the user equipment to receive a second random access response from the second access node.

The information indicating network resources may comprise information indicating one or more of a timing advance or a resource allocation.

The at least one memory and the computer program code may be configured to, with the at least one processor, cause the apparatus to transmit, to the second access node, information for configuring the second access node to transmit a random access response to the user equipment.

According to some examples the user equipment is in an idle state when in the first mode of operation.

According to an aspect, there is provided a method comprising: determining at least one condition; and based on the at least one condition, transmitting a data packet to a first access node using one of a first early data transmission type in a first mode of operation of the apparatus and a second early data transmission type in a second mode of operation of the apparatus.

The first mode of operation may comprise one of a long term evolution mode and a new radio mode, and the second mode of operation may comprise the other of the long term evolution mode and the new radio mode.

The at least one condition is determined based on, at least one of: comparing a data packet size to a threshold data packet size; comparing a reference signal received power/reference signal received quality to a threshold reference signal received power/reference signal received quality; and comparing a power headroom to a threshold power headroom.

The method may comprise receiving the at least one condition from at least one of the first access node or a second access node.

The method may comprise receiving, from the second access node, information indicating network resources for data packet transmission to the first access node using the second mode of operation.

The first access node may comprise a gNB, and the second access node may comprise an eNB.

The information indicating the network resources may comprise information indicating one or more of a timing advance or a resource allocation.

The first early data transmission type and the second early data transmission type may comprise: transmitting a random access request comprising a random access preamble from the apparatus; and receiving a random access response at the apparatus in response to the random access request.

The first early data transmission type may further comprise: transmitting the data packet, by using a message 3 in the first mode of operation, based on the random access response.

The second early data transmission type may further comprise: transmitting the data packet, by using a message 3 in the second mode of operation, based on the random access response.

The second early data transmission type may comprise: transmitting a random access request comprising a random access preamble to the second access node; receiving a random access response from the second access node, wherein the random access response received from the second access node comprises information indicating network resources for the apparatus to monitor for communication from the first access node; receiving a random access response from the first access node based on the information indicating the network resources comprised in the random access response received from the second access node; and transmitting the data packet to the first access node using early data transmission in the second mode of operation.

The method may comprise switching from the second mode of operation to the idle state in the first mode of operation after the data packet is transmitted in the second mode of operation.

According to some examples the apparatus is in an idle state when in the first mode of operation.

Transmitting the data packet may comprise transmitting an identifier, wherein the identifier is configured to cause the data packet to be routed to a destination prior to connection establishment.

The connection establishment may comprise a radio resource control connection establishment procedure.

According to an aspect, there is provided a method comprising: transmitting, to a user equipment, information indicating at least one condition configured to cause the user equipment to transmit a data packet using one of a first early data transmission type in a first mode of operation and a second early data transmission type in a second mode of operation based on the at least one condition; and transmitting, to the user equipment, information indicating network resources for the user equipment to perform data packet transmission using one of the first early data transmission type in the first mode of operation and the second early data transmission type in the second mode of operation.

The at least one condition may comprise at least one of: a threshold data packet size; a threshold reference signal received power/reference signal received quality; and a threshold power headroom.

The first early data transmission type may comprise: receiving a random access request comprising a random access preamble from the user equipment; and transmitting a random access response to the user equipment in response to the random access request.

The first early data transmission type may further comprise: receiving the data packet by using message 3.

The first early data transmission type may further comprise: receiving the data packet and an identifier by using message 3, wherein the apparatus is further configured to route the data packet to a destination based on the identifier.

The second early data transmission type may comprise: receiving, from the user equipment, a random access request comprising a random access preamble; and transmitting, to the user equipment, a first random access response comprising information indicating a physical downlink control channel for the user equipment to monitor for the user equipment to receive a second random access response from the second access node.

The information indicating network resources may comprise information indicating one or more of a timing advance or a resource allocation.

The method may comprise transmitting, to the second access node, information for configuring the second access node to transmit a random access response to the user equipment.

According to some examples the user equipment is in an idle state when in the first mode of operation.

According to an aspect, there is provided a computer readable medium comprising program instructions stored thereon for performing: determining at least one condition; and based on the at least one condition, transmitting a data packet to a first access node using one of a first early data transmission type in a first mode of operation of the apparatus and a second early data transmission type in a second mode of operation of the apparatus.

According to an aspect, there is provided a computer readable medium comprising program instructions stored thereon for performing: transmitting, to a user equipment, information indicating at least one condition configured to cause the user equipment to transmit a data packet using one of a first early data transmission type in a first mode of operation and a second early data transmission type in a second mode of operation based on the at least one condition; and transmitting, to the user equipment, information indicating network resources for the user equipment to perform data packet transmission using one of the first early data transmission type in the first mode of operation and the second early data transmission type in the second mode of operation.

According to an aspect, there is provided a non-transitory computer readable medium comprising program instructions stored thereon for performing determining at least one condition; and based on the at least one condition, transmitting a data packet to a first access node using one of a first early data transmission type in a first mode of operation of the apparatus and a second early data transmission type in a second mode of operation of the apparatus.

According to an aspect, there is provided a non-transitory computer readable medium comprising program instructions stored thereon for performing: transmitting, to a user equipment, information indicating at least one condition configured to cause the user equipment to transmit a data packet using one of a first early data transmission type in a first mode of operation and a second early data transmission type in a second mode of operation based on the at least one condition; and transmitting, to the user equipment, information indicating network resources for the user equipment to perform data packet using one of the first early data transmission type in the first mode of operation and the second early data transmission type in the second mode of operation.

According to an aspect, there is provided a computer program comprising computer executable code which when run on at least one processor is configured to cause an apparatus at least to: determine at least one condition; and based on the at least one condition, transmit a data packet to a first access node using one of a first early data transmission type in a first mode of operation of the apparatus and a second early data transmission type in a second mode of operation of the apparatus.

According to an aspect, there is provided a computer program comprising computer executable code which when run on at least one processor is configured to cause an apparatus at least to: transmit, to a user equipment, information indicating at least one condition configured to cause the user equipment to transmit a data packet using one of a first early data transmission type in a first mode of operation and a second early data transmission type in a second mode of operation based on the at least one condition; and transmit, to the user equipment, information indicating network resources for the user equipment to perform data packet transmission using one of the first early data transmission type in the first mode of operation and the second early data transmission type in the second mode of operation.

According to an aspect, there is provided a non-volatile tangible memory medium comprising program instructions stored thereon for performing at least one of the above methods.

According to an aspect, there is provided an apparatus comprising determining circuitry for determining at least one condition; and transmitting circuitry for transmitting, based on the at least one condition, a data packet to a first access node using one of a first early data transmission type in a first mode of operation of the apparatus and a second early data transmission type in a second mode of operation of the apparatus.

According to an aspect, there is provided an apparatus comprising transmitting circuitry for transmitting, to a user equipment, information indicating at least one condition configured to cause the user equipment to transmit a data packet using one of a first early data transmission type in a first mode of operation and a second early data transmission type in a second mode of operation based on the at least one condition; and transmitting circuitry for transmitting, to the user equipment, information indicating network resources for the user equipment to perform data packet transmission using one of the first early data transmission type in the first mode of operation and the second early data transmission type in the second mode of operation.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

Before describing various example embodiments, the following list of abbreviations is provided for reference:

| | |
|---|---|
| AMF | Access and Mobility Management Function |
| BWP | Bandwidth Part |
| CN | Core Network |
| DCI | Downlink Control Information |
| DL | Downlink |
| EDT | Early Data Transmission |
| eMBB | Enhanced Mobile Broadband |
| eMTC | Enhanced Machine Type Communication |
| FR | Frequency Range |
| gNB | Next generation (5 G) Node B |
| IMSI | International Mobile Subscriber Identity |
| IoT | Internet of Things |
| LTE | Long Term Evolution |
| MIB | Master Information Block |
| MPDCCH | MTC Physical Downlink Control Channel |
| MME | Mobility Management Entity |
| NB-IoT | Narrowband IoT |
| NR | New Radio (5 G) |
| PDCCH | Physical Downlink Control Channel |
| PDSCH | Physical Downlink Data Channel |
| PO | Paging Occasion |
| PRB | Physical Resource Block |
| P-RNTI | Paging Radio Network Temporary Identifier |
| QCI | QoS Class Identifier |
| QoS | Quality of Service |
| RAN | Radio Access Network |
| RAR | Random Access Response |
| RE | Resource Element |
| RNTI | Radio Network Temporary Identifier |
| RRC | Radio Resource Control |
| RS | Reference Signal |
| RSRP | Reference Signal Received Power |
| RSRQ | Reference Signal Received Quality |
| SIB | System Information Block |
| SMF | Session Management Function |
| SSB | Synchronization Signal Block |
| UE | User Equipment |
| UPF | User Plane Function |
| UR LLC | Ultra-Reliable Low Latency Communication |

Some example embodiments may be directed towards NR based Internet-of-things (NR-based IoT or NR-IoT), which is hereinafter referred to as "NR-Light". NR-Light may provide further use cases that may not be provided by New Radio Enhanced Mobile Broadband (NR eMBB), Ultra-Reliable Low Latency Communication (URLLC), or Enhanced Machine Type Communication (eMTC)/Narrowband IoT (NB-IoT).

NR-Light may support one or more of higher data rate & reliability and lower latency than eMTC & NB-IoT, lower cost/complexity and longer battery life than NR eMBB, and wider coverage than eMBB.

More specifically, in some example embodiments NR-Light may address one or more of the following objectives and use cases:

Moderate data rates up to 100 Mbps to support applications such as but not limited to live video feed, visual production control, and process automation;

Moderate latency of around 10-30 ms to support applications such as but not limited to remote drone operation, cooperative farm machinery, time-critical sensing and feedback, and remote vehicle operation;

Low complexity device with module cost comparable to LTE;

Coverage enhancement of 10-15 dB compared to eMBB;

Low power consumption with battery life 2-4 times longer than eMBB; and

Positioning accuracy of 30 cm-1 m to support applications such as but not limited to indoor asset tracking, coordinated vehicle control, and remote monitoring.

Figure 1:
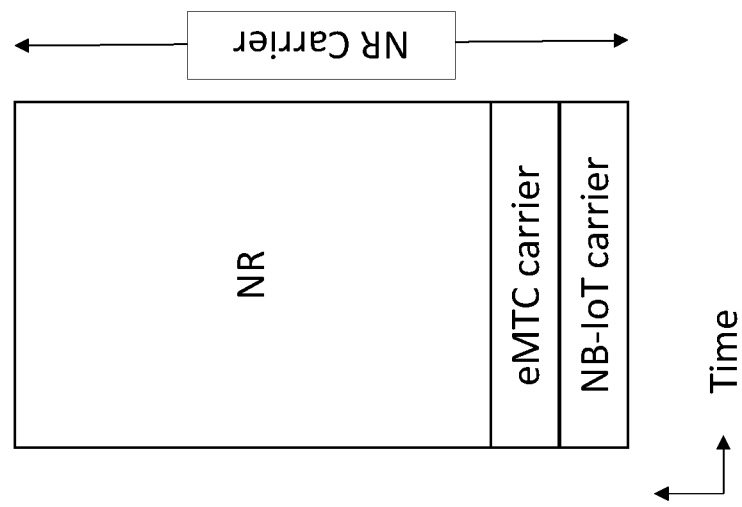
FIG. 1 shows a new radio (5G) carrier according to some example embodiments.

UEs supporting eMTC and NB-IoT technologies are currently deployed in LTE spectrum. As LTE spectrum is repurposed to NR, it may be desirable to continue to support legacy devices on the originally deployed eMTC and NB-IoT carriers. To enable such operation, eMTC and/or NB-IoT may be deployed within an NR carrier, as illustrated in FIG. 1.

eMTC and NB-IoT may have some desirable features compared to NR-Light such as very low power consumption and enhanced coverage. To take advantage of these features, UEs capable of operating in two modes may be introduced. In some example embodiments, UEs may be switched between the narrowband eMTC/NB-IoT carrier or the wideband NR carrier depending on which technology feature is more important at a given time.

In Rel-15 of eMTC/NB-IoT, early data transmission (EDT) feature was introduced. EDT allows data to be transmitted using random access procedure. UE can therefore quickly transmit or receive data without having to connect to the system and then go back to sleep. However, EDT may be limited in terms of how much data can be transmitted. For example, in eMTC/NB-IoT, up to 1000/680 bits may be transmitted using uplink EDT.

Figure 2:
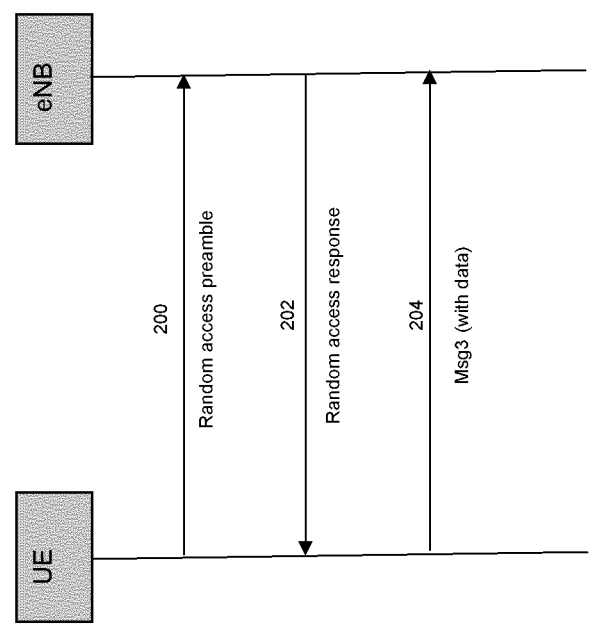
FIG. 2 shows an example signalling exchange for early data transmission.

A representation of an example method for EDT is shown in FIG. 2. EDT may enable the UE to transmit a small quantity of data in Msg3. In some example embodiments, if the UE has a larger data packet, it must use other communication procedures (such as initial access request, establishing an RRC connection, and subsequent data transmission) which may have higher overhead and latency compared to EDT.

The eNB may broadcast the maximum transport block size TBS allowed for EDT in a system information block (SIB) (for example, SIB1-BR/SIB1-NB). When the size of the UE data does not exceed the maximum TBS, the UE may initiate EDT by transmitting 200 a random access preamble to the eNB using resources reserved for EDT. In response, the eNB may transmit 202 a random access response, the response indicating allocated resources for Msg3 transmission. The UE may then transmit 204 data in Msg3 using an autonomously selected TBS not exceeding the broadcasted TBS.

In some example implementations, the data transmitted at step 204 may comprise an identifier for the user equipment. The identifier may be configured to cause the network to route the data to a destination prior to connection establishment. For example, the user equipment may initially perform connection establishment in order to inform the network of information relevant to the user equipment for EDT data routing, where the information may include the identifier for the user equipment. Thereafter, having configured the network with at least the identifier for the user equipment, the user equipment may send data packets along with the identifier, which allows the network to route the data packets to an appropriate destination based on the identifier. The routing may be performed without the user equipment performing full RRC connection establishment. The destination may, for example, comprise a network node, another apparatus, or the like.

While the communication procedure shown in FIG. 2 has been standardized for eMTC/NB-IoT, no similar procedure has yet been developed for NR/NR-Light.

Figure 3:
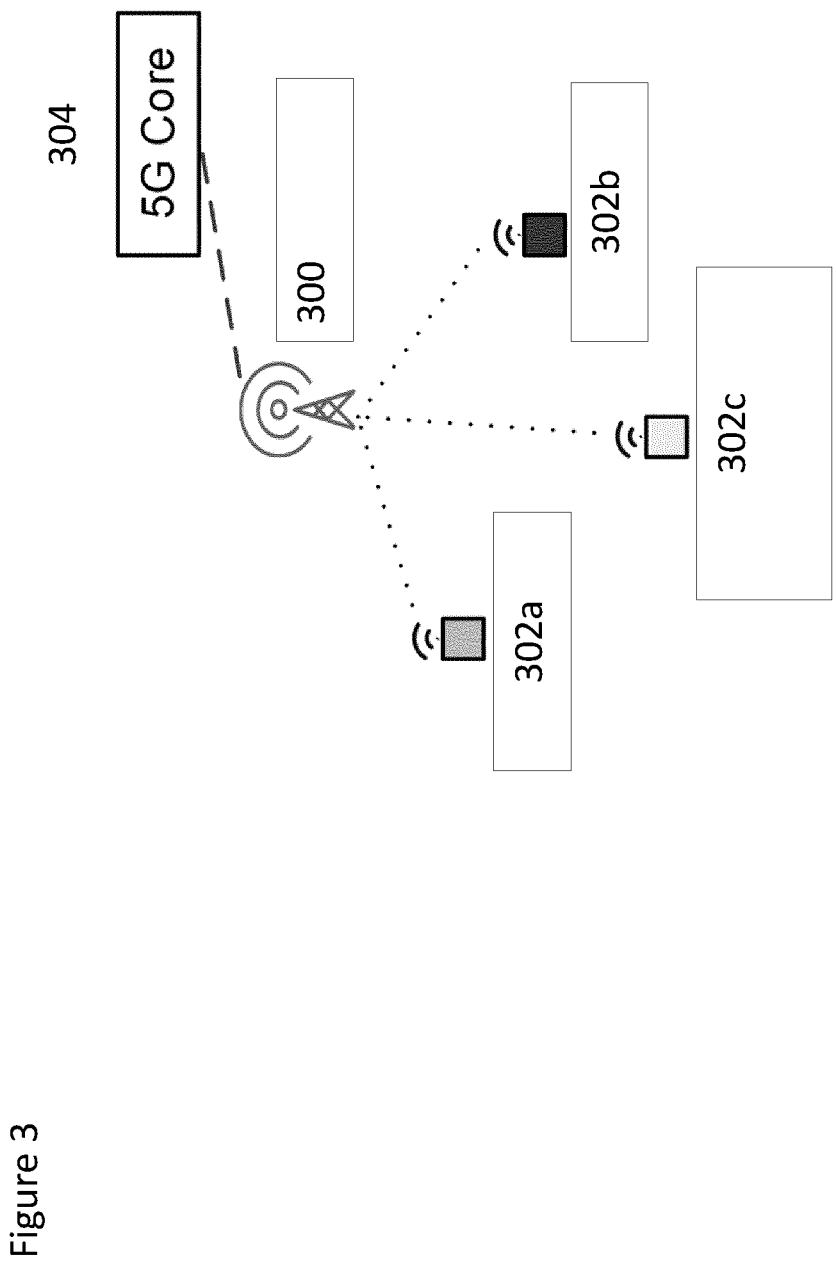
FIG. 3 shows a representation of a network according to some example embodiments.

As discussed previously, to support IIoT and Industry 4.0 deployment, in some cases NR-Light capable UEs may have dual mode capability—a first mode of operation for NR/NR-Light and a second mode of operation for eMTC/NB-IoT. In addition, in some cases, the carrier may also be deployed using NR with eMTC/NB-IoT in-band using only one physical base station (i.e. one node acting as eNB and gNB, requiring the eNB and gNB to be co-located) and connected to the 5G core network. As shown in FIG. 3, the eNB and gNB 300 are co-located and in communication with a NB-IoT UE 302*a*, a NR UE 302*b*, and a dual mode NR/NB-IoT UE 302*c*. The eNB/gNB 300 is also connected to the 5G Core Network 304.

Additionally or alternatively, the NR carrier may be deployed in one gNB while the eMTC/NB-IoT carrier is deployed from another, non-co-located eNB.

For a dual-mode capable UE 302*c*, it may be beneficial to keep the UE in eMTC/NB-IoT idle mode as this mode may have a very low power consumption. For example, a battery life of 10-15 years may be possible with eMTC/NB-IoT with high usage, and upwards of 35 years with low usage. With Mobile Originated (MO) data arrival, the UE may use the existing eMTC/NB-IoT EDT procedure for small data packets. The small data packet may be defined as a data packet having a size below a threshold size. For example, the threshold size may be 1000 bits for eMTC and 680 bits for NB-IoT.

Figure 6:
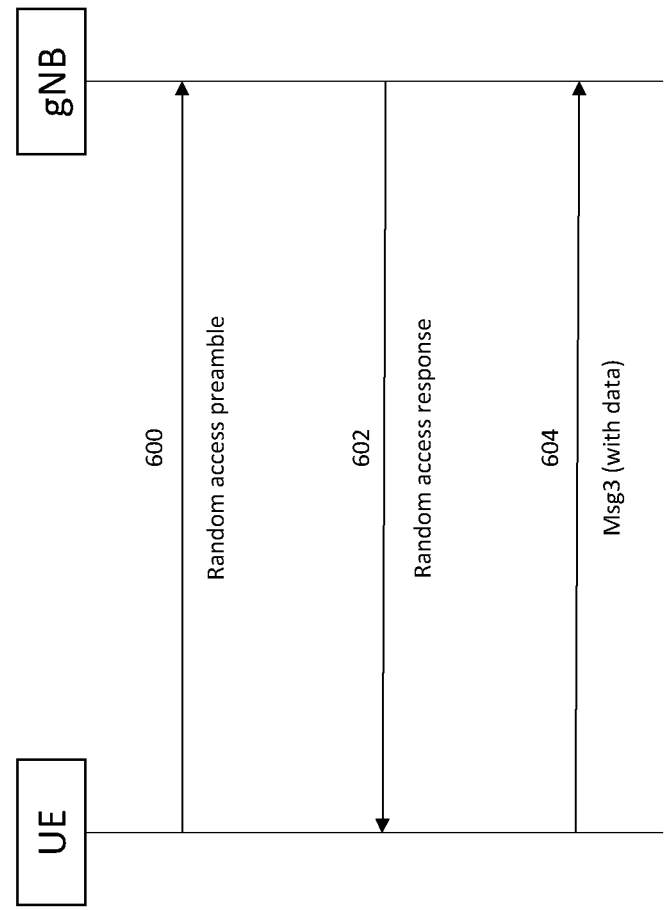

For a larger data packet, it may be beneficial to switch to NR/NR-Light and perform NR-EDT using a larger available bandwidth compared to LTE-EDT. Otherwise, UE may have to transition from idle into connection mode which would consume large overhead and power consumption. FIG. 6 shows a representation of a method for NR-EDT according to some example embodiments.

At step 600, the UE may transmit a random access preamble to the gNB. The random access preamble may comprise information indicating that the UE has a data packet to transmit to the gNB using early data transmission.

At step 602, the gNB may transmit a random access response to the UE. The random access response may comprise information indicating resources for the UE to perform data transmission of the data packet to the gNB.

At step 604, the UE may transmit the data packet to the gNB. The data packet may be sent as Msg3.

Therefore, a method is needed to allow fast switching at the UE between eMTC/NB-IoT mode and NR-EDT.

As used hereinafter, the eMTC/NB-IoT mode of operation is referred to as "LTE mode", and the NR/NR-Light mode of operation is referred to as "NR mode".

Figure 4A:
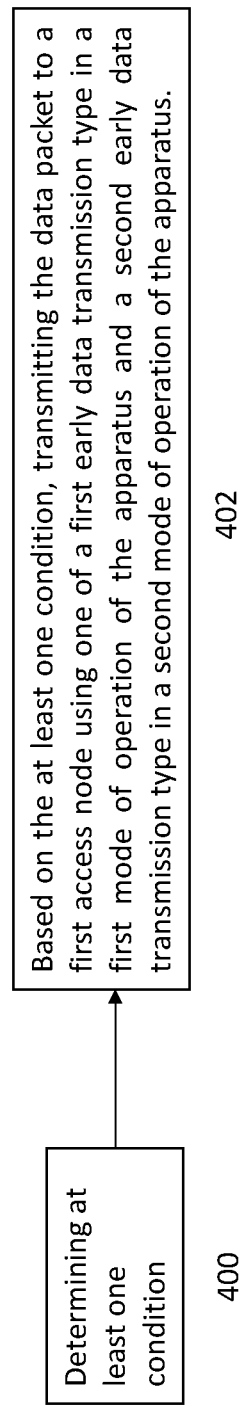
FIGS. 4a and 4b show methods according to some example embodiments.

Reference is made to FIG. 4*a*, which shows a method according to some example embodiments.

At step 400, the method may comprise determining at least one condition.

At step 402, the method may comprise, based on the at least one condition, transmitting the data packet to a first access node using one of a first early data transmission type in a first mode of operation of the apparatus and a second early data transmission type in a second mode of operation of the apparatus.

Figure 4B:
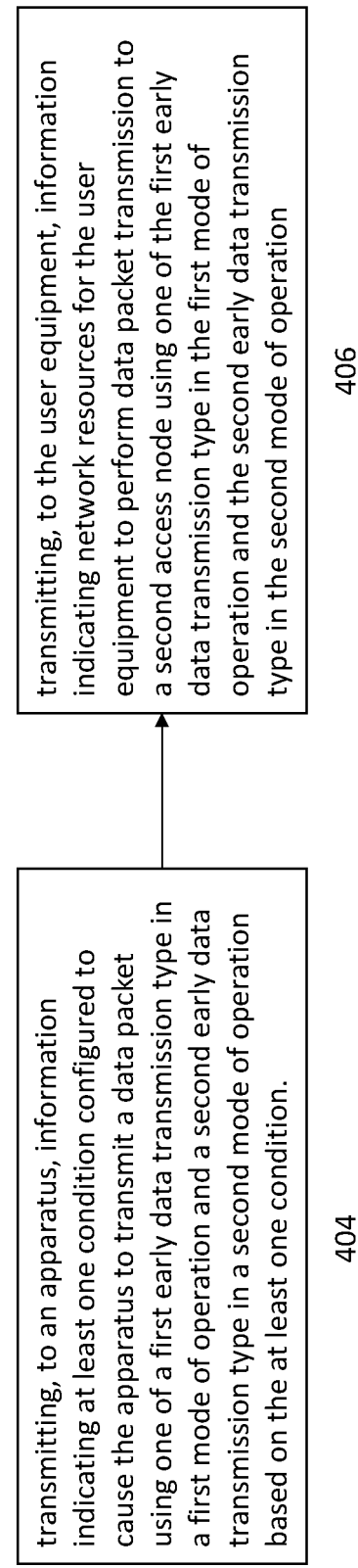

Reference is made to FIG. 4*b*, which shows a method according to some example embodiments.

At step 404, the method may comprise transmitting, to an apparatus, information indicating at least one condition configured to cause the apparatus to transmit a data packet using one of a first early data transmission type in a first mode of operation and a second early data transmission type in a second mode of operation based on the at least one condition.

At step 406, the method may comprise transmitting, to the user equipment, information indicating network resources for the user equipment to perform data packet transmission to a second access node using one of the first early data transmission type in the first mode of operation and the second early data transmission type in the second mode of operation.

In some example embodiments, the first early data transmission type may comprise an LTE early data transmission type (hereafter LTE-EDT), and the first mode of operation may comprise an LTE mode of operation. The second early data transmission type may comprise a NR early data transmission type (hereafter NR-EDT), and the second mode of operation may comprise a NR mode of operation.

Alternatively, in some example embodiments, the first early data transmission type may comprise a NR early data transmission type, and the first mode of operation may comprise a NR mode of operation. The second early data transmission type may comprise an LTE early data transmission type, and the second mode of operation may comprise an LTE mode of operation.

In some example embodiments, a UE may autonomously switch from a first mode of operation, such as an LTE mode of operation, to a second mode of operation, such as an NR mode of operation for data packet transmission when at least one condition is met. The at least one condition may comprise a data packet size being greater than a threshold data packet size. The threshold size may be any suitable size, such as but not limited to a size defined by the LTE-based EDT maximum packet size described previously.

In some example embodiments, the condition such as the threshold packet size may be configured at the UE based on signaling received from the eNB and/or gNB. That is to say, in some example embodiments, the eNB and/or gNB may transmit information comprising an indication to the UE to cause the UE to switch between NR mode and LTE mode based on the data packet size.

As an example, the UE may receive information from the eNB and/or gNB indicating that, where the data packet has a first size that is greater than a threshold size, the UE is configured to switch from LTE mode to NR mode for data packet transmission, and where subsequently the data packet has a second size that is less than the threshold size, the UE is configured to switch back to LTE mode for data packet transmission.

Figure 5:
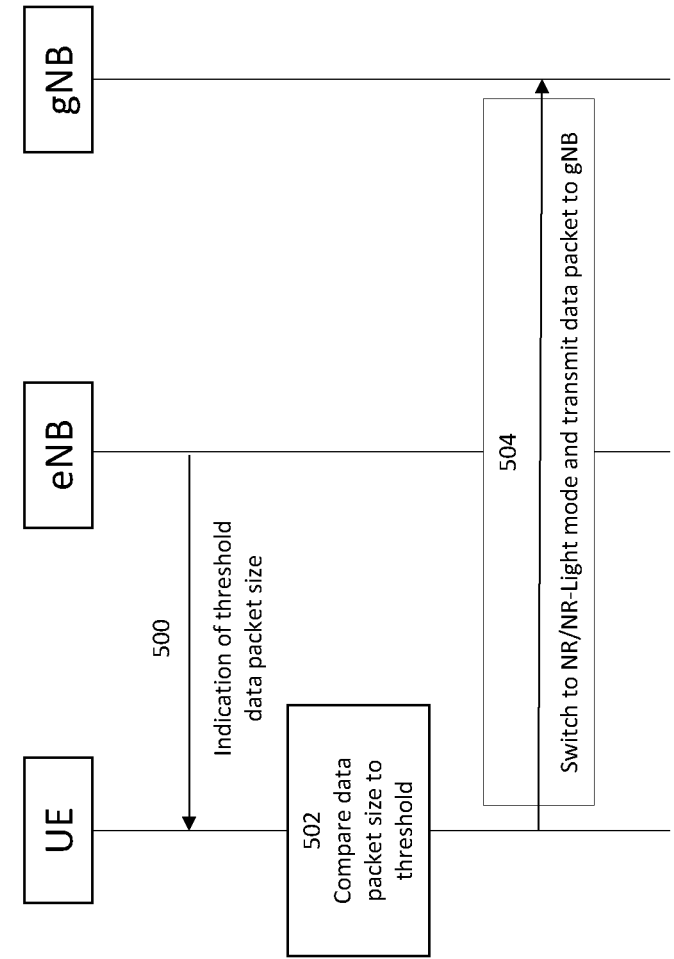
FIGS. 5 to 8 show various representations of signalling exchanges according to some example embodiments.

Reference is made to FIG. 5, which shows a representation of a method according to some example embodiments.

At step 500, the eNB transmits information comprising an indication of a threshold data packet size for LTE-EDT.

At step 502, the UE determines whether a size of a data packet for transmission is greater than or less than the threshold data packet size.

At step 504, responsive to determining that the data packet size for transmission is above the threshold, the UE switches operation mode to NR/NR-Light mode, and performs the transmission of the data packet to the gNB.

In some example embodiments, the UE may transmit to the network UE capability information for fast switching between NR mode and LTE mode. The network may then transmit the information comprising an indication to enable switching between NR mode and LTE based on the received UE capability information.

In some example embodiments the UE may be configured with NR parameters required to operate in NR mode. The NR parameters may include, for example, SIB1, SSB/PRACH, reserved preamble, NR cells/frequencies/areas (e.g. RNA or Registration area) where the UE is allowed to switch to perform UL transmission and also the CORESET region to associated with EDT PRACH Resources. The NR parameters may be transmitted to the UE via the eNB (i.e. while the UE is in LTE mode), and/or via the gNB (i.e. while the UE is in NR mode).

In some example embodiments, the eNB may transmit information to the UE indicating at least two PRACH resource sets. The information indicating the at least two PRACH resource sets may comprise one or more of PRACH preambles, timing information and frequency information for PRACH signaling.

In some example embodiments, a first PRACH resource set may be used by the UE for LTE-EDT (for example by the method shown in FIG. 2), and a second PRACH resource set may be used for the UE to request for NR-EDT (for example by the method shown in FIG. 6). For example, where the UE is initially operating in LTE mode, the UE may transmit the PRACH preamble on the second PRACH resource to request NR-EDT.

In some example embodiments, any suitable low-overhead data transmission procedure may be used instead of EDT during random access. For example, a two-step RACH procedure may be utilized when the UE is in NR mode instead of NR-EDT. The eNB may provide the UE with information for implementing the low-overhead data transmission procedure.

On receiving a PRACH preamble on either the first and/or second PRACH resource, the eNB may transmit a radio access response (RAR) based on the PRACH resource on which the preamble was received. The RAR may comprise one or more of a timing advance and resource allocation for NR-EDT transmission. In other words, the eNB may transmit, to the UE, information indicating network resources for data packet transmission to the gNB.

When the eNB receives the PRACH preamble on the second PRACH resource (i.e. the UE transmits the PRACH preamble to the eNB to request NR-EDT), the eNB may provide the UE with information for establishing RACH communication with the gNB for NR-EDT. The information for establishing NR-EDT may comprise one or more NR Bandwidth Parts (NR BWPs), each NR BWP comprising an indication of a time/frequency where the UE should monitor for further information. In some example embodiments, a NR Common Search Space within the NR BWP may indicate the resources (time/frequency) that the UE should monitor for downlink control channel signaling In some example embodiments, the UE may directly access NR uplink resources for NR-EDT based on the information received in the RAR from the eNB. In some example embodiments, when the eNB and gNB are co-located, the timing information of the gNB may be synchronized with the eNB. As such, some example embodiments may require no further network synchronization.

Figure 7:
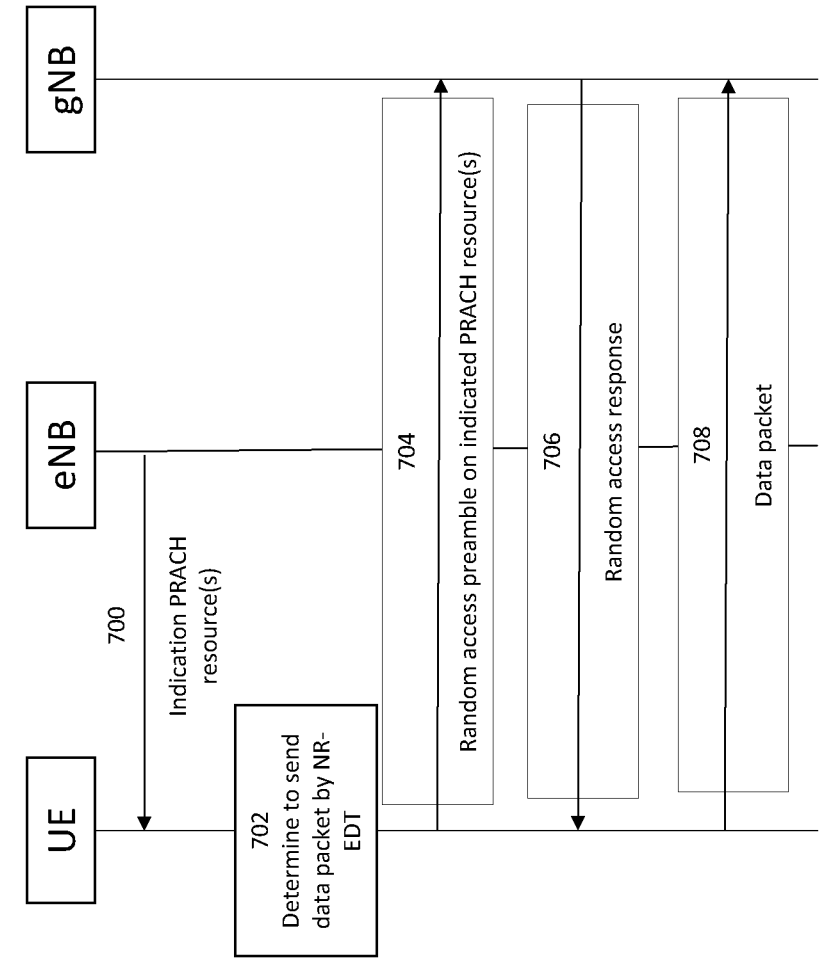

Reference is made to FIG. 7, which shows a representation of a method according to some example embodiments, where the UE transmits the PRACH preamble on the second PRACH resource to request NR-EDT.

At step 700, the eNB transmits information indicating one or more PRACH resources for NR-EDT access to the UE.

At step 702, the UE determines to send a data packet by NR-EDT.

At step 704, the UE transmits a random access preamble to the gNB on the one or more PRACH resources indicated by the eNB.

At step 706, the gNB transmits a random access response to the UE in response to the preamble received in step 704.

At step 708, the UE transmits the data packet to the gNB.

In some embodiments, where no NR resources are available for NR-EDT access, the eNB may transmit a RAR comprising an indication for the UE to fall back to RRC connection setup procedures.

In some example embodiments, the RAR received at the UE from the eNB may comprise information indicating a NR control region. The NR control region may be considered information comprising an indication of timing information and/or frequency information for the UE to listen for PDCCH transmission from the gNB to receive the RAR from the gNB. Therefore, in some example embodiments, the UE initially in LTE mode may be caused to switch to NR mode to receive a RAR from the gNB without the UE having to resend a random access request to the gNB when in NR mode.

Figure 8:
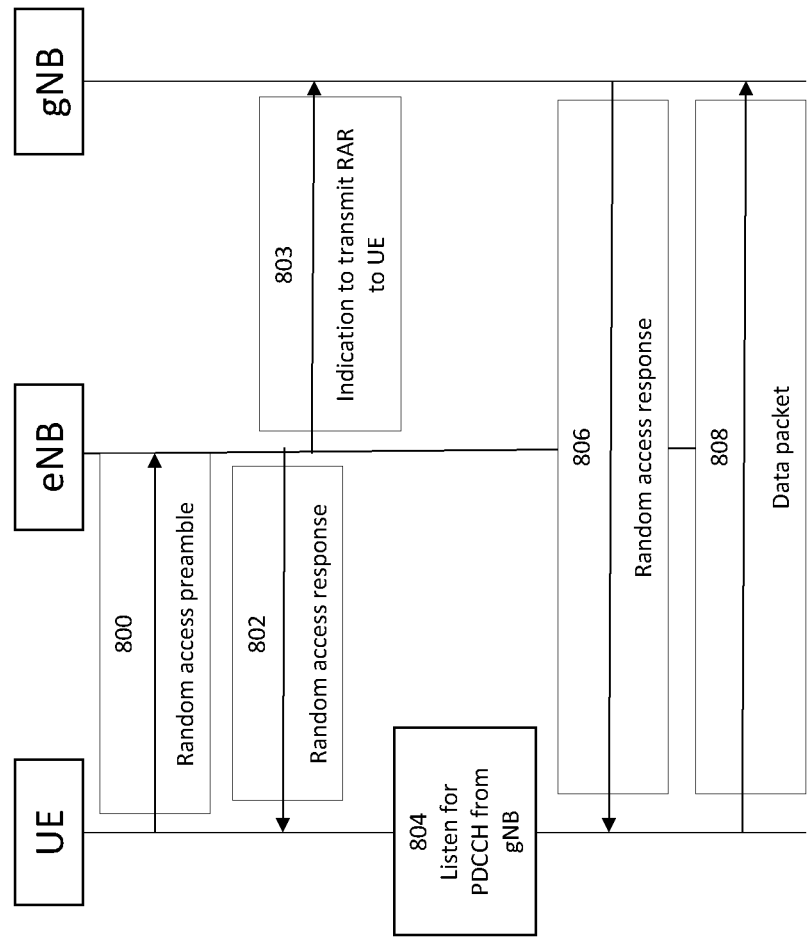

Reference is made to FIG. 8, which shows an example method for the UE receiving a RAR from the gNB without having to send a random access preamble to the gNB.

At step 800, the UE transmits a random access preamble to the eNB.

At step 802, the eNB transmits a random access response to the UE. The random access response sent by the eNB comprises information indicating PDCCH resources for the UE to use to listen for transmissions from the gNB.

At step 803, the eNB transmits information to the gNB (for example, over X2 interface) indicating that the gNB is to transmit a random access response to the UE. Step 803 may be performed either before, after, or at substantially the same time, as step 802.

At step 804, the UE listens for PDCCH transmission from the gNB.

At step 806, the gNB transmits a random access response using the PDCCH resources indicated by the information comprised in the random access response sent by the eNB to the UE in step 802.

At step 808, the UE transmits data to the gNB based on the random access response received from the gNB in step 806.

In some example embodiments, the information indicating the NR control region may further comprise one or more conditions defining when the UE should perform NR-EDT. The one or more conditions may comprise one or more of a data packet size, a reference signal received power/reference signal received quality (RSRP/RSRQ), and a power headroom.

The conditions may further define a threshold with respect to each condition—for example, the conditions may define a data packet size threshold, a RSRP/RSRQ threshold, and a power headroom threshold. The threshold(s) may be related to the eNB and/or the gNB. That is to say, for example, the RSRP/RSRQ threshold may be a threshold with respect to the eNB or the gNB.

The UE may determine one or more parameters relative to a respective parameter threshold (for example, the UE may compare a data packet size against a data packet size threshold) in order to determine whether a condition has been met, and thus whether to switch to NR-EDT, or whether to remain in LTE mode.

In some example embodiments, the information indicating the NR control space may further comprise an allocation of transmission type (for example LTE mode or NR mode). The transmission type allocated may be based on one or more of a type of data being transmitted, a priority of the data being transmitted, and a quality of service (QoS) or QoS Class Identifier (QCI). That is to say, for example, a first transmission type may be allocated for transmission in LTE mode, and a second transmission type may be allocated for transmission in NR mode.

In some example embodiments, the UE may select a synchronization signal block (SSB). The selected SSB may be selected based on any suitable parameter, such as but not limited to a highest received signal power. The UE may then transmit a random access request comprising a reserved preamble on the PRACH configuration associated with the selected SSB. The reserved preamble may indicate to the gNB that the UE is requesting NR mode EDT transmission in the random access request.

In some example embodiments, the network may require the UE to synchronize with the gNB before NR-EDT access. This may be the case, for example, where the eNB and gNB are not co-located, and the timing sequence for the eNB cannot be used for the gNB.

In some example embodiments, the UE may directly communicate with the gNB in order to set up NR-EDT.

For example, the UE may transmit a random access request requesting NR-EDT to the gNB. The gNB may determine whether to allow the UE to perform NR-EDT (for example, based on system loading, radio link condition, or traffic priority). When the gNB determines that the UE is to be allowed to perform the NR-EDT, the gNB may transmit a random access response to the UE indicating that the UE may perform NR-EDT. The random access response sent by the gNB to the UE may comprise the Modulation and Coding Selection (MCS) and/or Transport Block Size (TBS).

After receiving the random access response from the gNB indicating that the UE may perform NR-EDT, the UE may perform NR-EDT. In some example embodiments, after performing NR-EDT, the UE may switch back to LTE mode (for example, return to or resume idle or connected mode or state on the LTE carrier). By returning to LTE mode after NR transmission, some example embodiments may reduce power consumption, thereby prolonging battery life of the UE.

In some example embodiments, the eNB may exchange information with the gNB. For example, configurations (such as but not limited to PRACH configurations) and parameters (such as but not limited to RSRP/RSRQ thresholds) may be exchanged between the eNB and the gNB via an Xn interface. For example, the gNB may provide NR carrier configurations, NR-Light EDT parameters etc. to the eNB.

In some example embodiments, the eNB and/or the gNB may update respective eNB and/or gNB switching configurations based on the information exchanged.

The abovementioned embodiments have been described with reference to the UE switching from LTE mode to NR-EDT. However, in some example embodiments, the UE may switch from LTE mode to NR Connected mode.

In some example embodiments, the UE may be configured via signaling when in NR Connected mode. The signaling may be sent from the gNB to the UE. The signaling may comprise information for configuring the UE to switch to NR Connected mode transmission of data packets having a size above a threshold size. After transmitting the data packet via NR Connected mode, the UE may then switch back to LTE mode.

In some example embodiments, the switching to NR Connected mode may be configured via a NR resource or NR-EDT. In some example embodiments, the switching may be configured via control information sent via the eNB.

In some example embodiments, where switching is based on signal conditions such as but not limited to RSRP/RSRQ measurements, a hysteresis may be applied to prevent the UE from frequently switching between modes of operation. That is to say, for example, if a first RSRP measurement is below a threshold value, thereby indicating that the UE should operate in NR Connected mode, the UE may not switch back to LTE mode unless a second RSRP measurement is more than a fixed amount above the threshold value.

Some embodiments may therefore provide a method allowing a UE to stay in LTE mode, thereby consuming very little power, while being able to quickly switch to NR mode for EDT or NR Connected mode when larger amounts of data are required for transmission by the UE. This may reduce latency and power consumption for NR mode capable devices.

Furthermore, in some example embodiments, the UE may be able to switch almost instantaneously from LTE mode to NR mode, as the two operation modes utilize the same carrier, thereby enabling the UE to maintain synchronization to both LTE and NR using LTE mode signaling.

While the forgoing example embodiments have been described with reference to switching from an LTE mode of operation to a NR mode of operation for performing early data transmission, it should be understood that in some example embodiments, switching may occur from a NR mode of operation to an LTE mode of operation for performing early data transmission.

Figure 9:
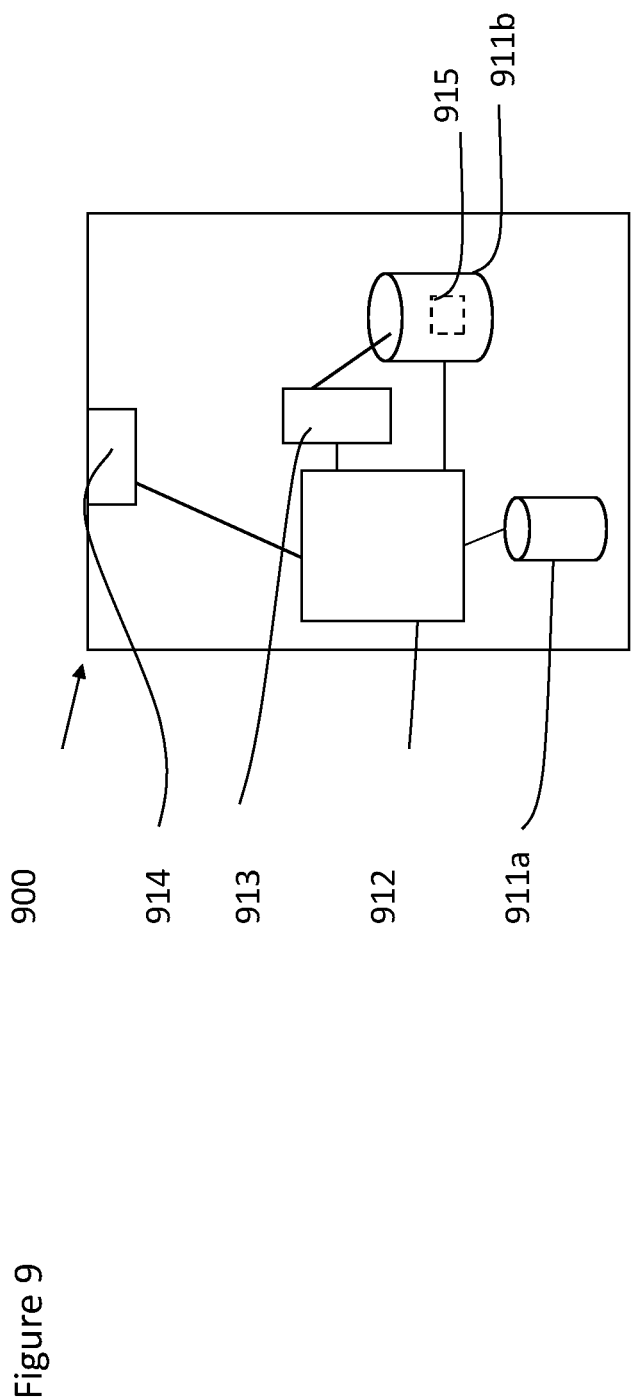
FIG. 9 shows a representation of a control apparatus according to some example embodiments.

FIG. 9 illustrates an example of a control apparatus 900 for controlling a function of the eNB or gNB as described previously. The control apparatus may comprise at least one random access memory (RAM) 911a, at least on read only memory (ROM) 911b, at least one processor 912, 913 and an input/output interface 914. The at least one processor 912, 913 may be coupled to the RAM 911a and the ROM 911b. The at least one processor 912, 913 may be configured to execute an appropriate software code 915. The software code 915 may for example allow to perform one or more steps to perform one or more of the present aspects. The software code 915 may be stored in the ROM 911b. The control apparatus 900 may be interconnected with another control apparatus 900 controlling another function of the NR network. In some embodiments, each function of the NR network comprises a control apparatus 900. In alternative embodiments, two or more functions of the NR network may share a control apparatus.

Figure 10:
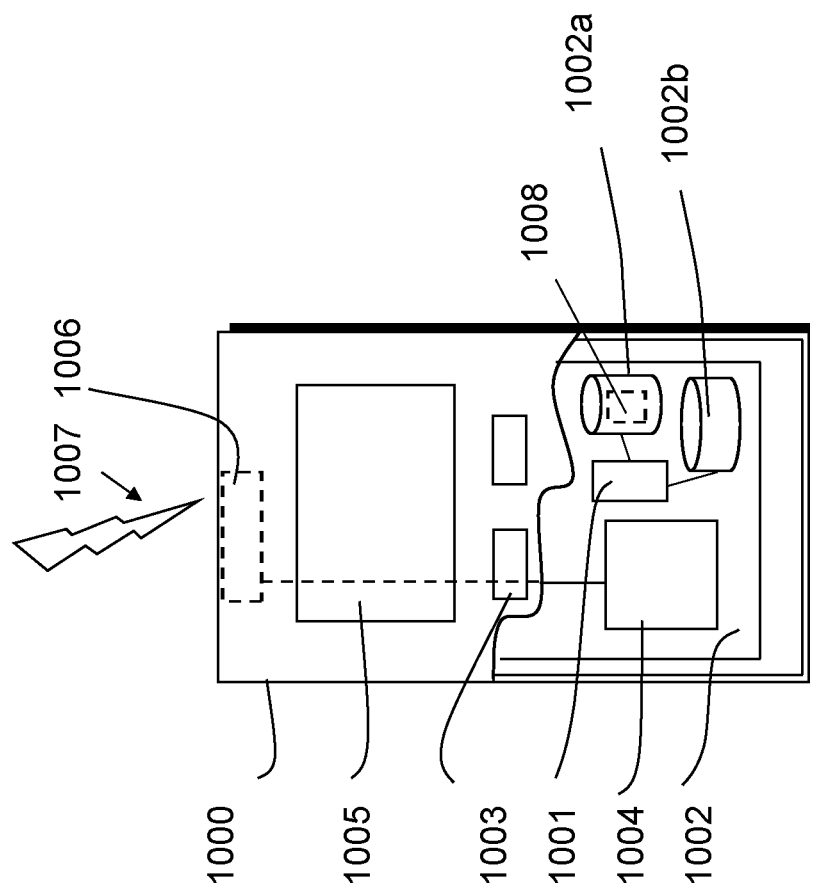
FIG. 10 shows a representation of an apparatus according to some example embodiments.

FIG. 10 illustrates an example of a user equipment or terminal 1000, such as a user equipment described previously. The terminal 1000 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 1000 may provide, for example, communication of data for carrying communications. The communications may be one or more of voice, electronic mail (email), text message, multimedia, data, machine data and so on.

The terminal 1000 may receive signals over an air or radio interface 1007 via appropriate apparatus for receiving and may transmit signals via appropriate apparatus for transmitting radio signals. In FIG. 10 transceiver apparatus is designated schematically by block 1006. The transceiver apparatus 1006 may be provided for example by means of a radio part and associated antenna arrangement. The antenna arrangement may be arranged internally or externally to the mobile device.

The terminal 1000 may be provided with at least one processor 1001, at least one memory ROM 1002a, at least one RAM 1002b and other possible components 1003 for use in software and hardware aided execution of tasks it is designed to perform, including control of access to and communications with access systems and other communication devices. The at least one processor 1001 is coupled to the RAM 1011a and the ROM 1011b. The at least one processor 1001 may be configured to execute an appropriate software code 1008. The software code 1008 may for example allow to perform one or more of the present aspects. The software code 1008 may be stored in the ROM 1011b.

The processor, storage and other relevant control apparatus can be provided on an appropriate circuit board and/or in chipsets. This feature is denoted by reference 1004. The device may optionally have a user interface such as key pad 1005, touch sensitive screen or pad, combinations thereof or the like. Optionally one or more of a display, a speaker and a microphone may be provided depending on the type of the device.

Figure 11:
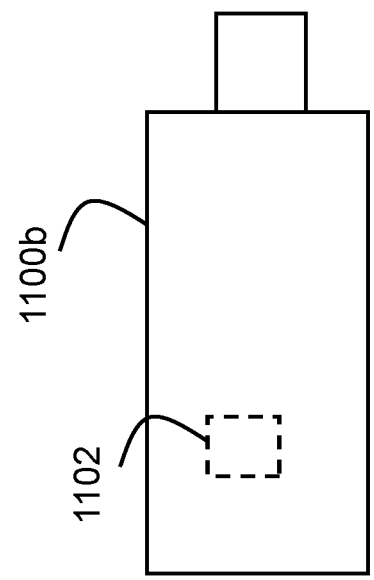
FIG. 11 shows a representation of non-volatile memory media according to some example embodiments.
Figure 11:
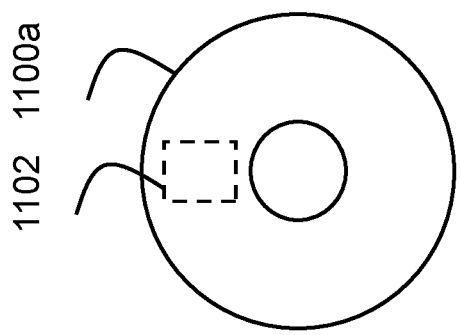

FIG. 11 shows a schematic representation of non-volatile memory media 1100a (e.g. computer disc (CD) or digital versatile disc (DVD)) and 1100b (e.g. universal serial bus (USB) memory stick) storing instructions and/or parameters 1102 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. An apparatus comprising: at least one processor; and at least one memory including computer program code, the at least one memory and computer program code configured to, with the at least one processor, cause the apparatus to perform:
transmitting a random access request comprising a random access preamble to a second access node;
receiving a random access response from the second access node, wherein the random access response received from the second access node comprises information indicating network resources for the apparatus to monitor for communication from a first access node;
receiving a random access response from the first access node based on the information indicating the network resources from the random access response received from the second access node, wherein the information comprises a plurality of conditions configured to cause the apparatus to transmit a data packet using one of a first early data transmission type in a first mode of operation and a second early data transmission type in a second mode of operation based on the plurality of conditions being met, the plurality of conditions comprising the following: a data packet size threshold being exceeded, a reference signal received power/reference signal received quality threshold being exceeded, and a power headroom threshold being exceeded, wherein the first early data transmission type is a long term evolution mode (LTE) early data transmission type (LTE-EDT), the first mode of operation is an LTE mode of operation, the second early data transmission type is a new radio (NR) early data transmission type (hereafter NR-EDT), and the second mode of operation is an NR mode of operation;

based on the plurality of conditions being met, transmitting a data packet to the first access node using the second early data transmission type in the second mode of operation of the apparatus; and after transmitting the data packet, switching back to LTE mode to reduce power consumption.

2. The apparatus of claim 1, wherein the plurality of conditions are determined based on, at least one of:
comparing a data packet size to a threshold data packet size;
comparing a reference signal received power/reference signal received quality to a threshold reference signal received power/reference signal received quality; and
comparing a power headroom to a threshold power headroom.

3. The apparatus of claim 1, wherein the apparatus is further configured to perform receiving, from the second access node, information indicating network resources for data packet transmission to the first access node using the second mode of operation.

4. The apparatus of claim 3, wherein the first access node comprises a gNB, and the second access node comprises an eNB.

5. The apparatus of claim 3, wherein the information indicating the network resources comprises information indicating one or more of a timing advance or a resource allocation.

6. A method comprising:
transmitting a random access request comprising a random access preamble to a second access node;
receiving a random access response from the second access node, wherein the random access response received from the second access node comprises information indicating network resources for the apparatus to monitor for communication from a first access node;
receiving a random access response from the first access node based on the information indicating the network resources from the random access response received from the second access node, wherein the information comprises a plurality of conditions configured to cause the apparatus to transmit a data packet using one of a first early data transmission type in a first mode of operation and a second early data transmission type in a second mode of operation based on the plurality of conditions being met, the plurality of conditions comprising the following: a data packet size threshold being exceeded, a reference signal received power/reference signal received quality threshold being exceeded, and a power headroom threshold being exceeded, wherein the first early data transmission type is a long term evolution mode (LTE) early data transmission type (LTE-EDT), the first mode of operation is an LTE mode of operation, the second early data transmission type is a new radio (NR) early data transmission type (hereafter NR-EDT), and the second mode of operation is an NR mode of operation;
based on the plurality of conditions being met, transmitting a data packet to the first access node using the second early data transmission type in the second mode of operation of the apparatus; and
after transmitting the data packet, switching back to LTE mode to reduce power consumption.

7. The method of claim 6, wherein the at least one condition is determined based on, at least one of:
comparing a data packet size to a threshold data packet size;
comparing a reference signal received power/reference signal received quality to a threshold reference signal received power/reference signal received quality; and
comparing a power headroom to a threshold power headroom.

8. The method of claim 6, further comprising:
receiving, from the second access node, information indicating network resources for data packet transmission to the first access node using the second mode of operation.

9. The method of claim 8, wherein the first access node comprises a gNB, and the second access node comprises an eNB.

10. The method of claim 8, wherein the information indicating the network resources comprises information indicating one or more of a timing advance or a resource allocation.

11. A non-transitory computer storage medium storing instructions which when run on one or more processors cause an apparatus to perform:
transmitting a random access request comprising a random access preamble to a second access node;
receiving a random access response from the second access node, wherein the random access response received from the second access node comprises information indicating network resources for the apparatus to monitor for communication from a first access node;
receiving a random access response from the first access node based on the information indicating the network resources from the random access response received from the second access node, wherein the information comprises a plurality of conditions configured to cause the apparatus to transmit a data packet using one of a first early data transmission type in a first mode of operation and a second early data transmission type in a second mode of operation based on the plurality of conditions being met, the plurality of conditions comprising the following: a data packet size threshold being exceeded, a reference signal received power/reference signal received quality threshold being exceeded, and a power headroom threshold being exceeded, wherein the first early data transmission type is a long term evolution mode (LTE) early data transmission type (LTE-EDT), the first mode of operation is an LTE mode of operation, the second early data transmission type is a new radio (NR) early data transmission type (hereafter NR-EDT), and the second mode of operation is an NR mode of operation;
based on the plurality of conditions being met, transmitting a data packet to the first access node using the second early data transmission type in the second mode of operation of the apparatus; and
after transmitting the data packet, switching back to LTE mode to reduce power consumption.

12. The non-transitory computer storage medium storing the instructions of claim 11, wherein the at least one condition is determined based on, at least one of:
comparing a data packet size to a threshold data packet size;
comparing a reference signal received power/reference signal received quality to a threshold reference signal received power/reference signal received quality; and
comparing a power headroom to a threshold power headroom.

* * * * *